United States Patent [19]

Schuller et al.

[11] Patent Number: 4,745,410
[45] Date of Patent: May 17, 1988

[54] TOWING VEHICLE MONITORING DEVICE

[75] Inventors: Reinhard Schuller, Munich; Wolfgang Heiser, Dachau, both of Fed. Rep. of Germany

[73] Assignee: Krauss-Maffei A.G., Fed. Rep. of Germany

[21] Appl. No.: 911,145

[22] Filed: Sep. 24, 1986

[30] Foreign Application Priority Data

Sep. 24, 1985 [DE] Fed. Rep. of Germany ....... 3534044

[51] Int. Cl.⁴ ............................................. G08B 21/00
[52] U.S. Cl. .................................................... 340/958
[58] Field of Search .............. 73/432.1, 628; 364/550, 364/551, 560, 561, 562, 563; 181/124; 180/14.1, 14.7, 904; 244/50; 367/104, 114, 7, 103; 340/958, 52 R, 686, 945, 958

[56] References Cited

U.S. PATENT DOCUMENTS

| | | | |
|---|---|---|---|
| 2,016,906 | 10/1935 | Rice | 181/124 |
| 2,362,981 | 11/1944 | Baum | 414/428 |
| 2,754,499 | 7/1956 | Jost | 340/52 R |
| 2,877,911 | 3/1959 | Arnot | 180/904 |
| 2,985,018 | 5/1961 | Williams | 73/703 |
| 3,164,661 | 1/1965 | Dellon | 364/551 |
| 3,683,440 | 8/1972 | Xenakis et al. | |
| 3,872,283 | 3/1975 | Smith et al. | 364/550 |
| 4,057,158 | 11/1977 | Lissy | 180/904 |
| 4,113,041 | 9/1978 | Birkeholm | 180/14.1 |
| 4,201,971 | 5/1980 | Saglio | 367/95 |
| 4,332,016 | 5/1982 | Berntsen | 367/7 |
| 4,357,833 | 11/1982 | Wiklund et al. | 364/561 |
| 4,375,244 | 3/1983 | Morin | 180/14.7 |

FOREIGN PATENT DOCUMENTS

| | | | |
|---|---|---|---|
| 0043396 | 1/1982 | European Pat. Off. | 367/114 |
| 3014767 | 10/1980 | Fed. Rep. of Germany | 180/904 |
| 2532437 | 8/1982 | France . | |
| 0108600 | 8/1979 | Japan | 364/562 |
| 85/00790 | 2/1985 | PCT Int'l Appl. . | |
| 2050977 | 1/1981 | United Kingdom | 73/763 |

Primary Examiner—Stewart J. Levy
Assistant Examiner—Robert R. Raevis
Attorney, Agent, or Firm—Robert J. Koch

[57] ABSTRACT

A device for tow vehicles intended for maneuvering commercial aircraft, where the type of aircraft to be towed is identified and the turn-out angle between the longitudinal axes of the vehicle and the aircraft is determined and monitored during the towing process. The type of aircraft may be ascertained by measuring the width of the nose gear assembly. The turn-out angle can be calculated by measuring the relative distances between opposing sensors on the tow vehicle and the fuselage utilizing a characteristic hull shape of the particular type of aircraft.

14 Claims, 4 Drawing Sheets

TOWING VEHICLE MONITORING DEVICE

BACKGROUND OF THE INVENTION

1. Field of the Invention

The invention relates to a tow vehicle and more particularly a vehicle for towing aircraft.

2. Description of the Related Technology

U.S. Pat. No. 2,362,981 is directed to an airplane tow vehicle or lift doly comprising a fork or "C" shaped frame with two scissor lifting type adjustable blades. The fork-like frame is positioned approximately at right angles to the aircraft so that the lifting blades may be inserted under the running surface of the nose wheel. The blades or shoes are then adjusted to grip and raise the wheel. After the nose wheel is raised the tow vehicle and aircraft may be moved.

It is preferable that the angle between the longitudinal axes of the vehicle and the axes of the aircraft (designated hereafter the "turn-out angle") be as small as possible. The stability of the aircraft-vehicle assembly decreases with an increased turn-out angles. Care must be taken, particularly in case of sharp curves and/or high maneuvering speeds, not to exceed the maximum turn-out angle which is a function of the type of the aircraft. The same is true for the forces applied by the lifting blades during the raising process to the nose wheel. Here again, the maximum values which depend on the type of the aircraft for the horizontal and vertical force components must not be exceeded if damage to the nose wheel assembly is to be avoided.

SUMMARY OF THE INVENTION

It is an object of the invention to provide a tow vehicle capable of identifying the type of the aircraft to be towed and to determine and monitor the turn-out angle in the course of the towing process.

This object may be attained according to the invention by a tow vehicle for aircraft, with a fork-shaped frame part. Two lifting blades are mounted on the frame for moving in a scissor-like manner for the gripping and raising of the nose wheel of the aircraft. The vehicle includes a device (10-100, 110-200) mounted on the tow vehicle (1) for the automatic, contactless measurement and evaluation of certain distances (X1, X2, Y1, Y2) between the bottom side of the aircraft fuselage (2) and the tow vehicle, and between the nose wheel and the tow vehicle (1).

The measuring and evaluation device (10-100, 110-200) comprises at least two spaced apart transmitter/receivers (10, 20; 110, 120) for sound or other pulse signals. The transmitter/receivers (110,120) may be or are oriented at the same angle of elevation with respect to the vehicle platform against the bottom side of the vehicle fuselage (3). The transmitter/receivers (10, 20) further may be or are oriented onto opposite frontal surfaces of the nose wheel (3).

Each transmitter/receiver (10, 20; 110, 120) is associated with a counter (40, 50, 140 or 150) actuated upon the emission of a pulse signal and stopped when the appropriate pulse signals reflected from the aircraft fuselage (2) or the nose wheel (3) are received. The difference of the counter settings at the emittance and receipt of a pulse signal is a measure of distance (X1, X2, Y1, Y2) measured. A first evaluating circuit (60-100) connected with the counters (40, 50) determines the track width of the nose wheel from the difference between the given distance between the two transmitter/receivers (10, 20) and the sum (Y1+Y2) of the distances (Y1, Y2) determined between the transmitter/receivers (10, 20) and the frontal surfaces of the nose wheel assembly. The evaluating circuit compares the value determined in this manner with stored values of aircraft specific nose wheel track widths and to derive from an aircraft type identification signal. A second evaluating device (160-200) connected with the counters (140, 150) determines the value of the instantaneous turn-out angle between the longitudinal axes (7, 8) of the tow vehicle (1) and the aircraft being towed from the difference between the instantaneously determined distance (X1, X2) between the transmitter/receivers (110, 120) and the fuselage (2) of the aircraft and a correction factor stored in memory for all aircraft types.

The stored correction factor may advantageously be called up as a function of the aircraft identification signal. The two transmitter/receivers (110, 120) for the measurement of the turn-out angle may be mounted on the left and right lateral contour of the tow vehicle (1) at an angle of elevation of 70° to 80°.

The two transmitter/receivers (10, 20) for the identification of the aircraft type may advantageously be mounted in the area of the lifting blades (5).

DETAILED DESCRIPTION OF THE PREFERRED EMBODIMENT

Figure 1:
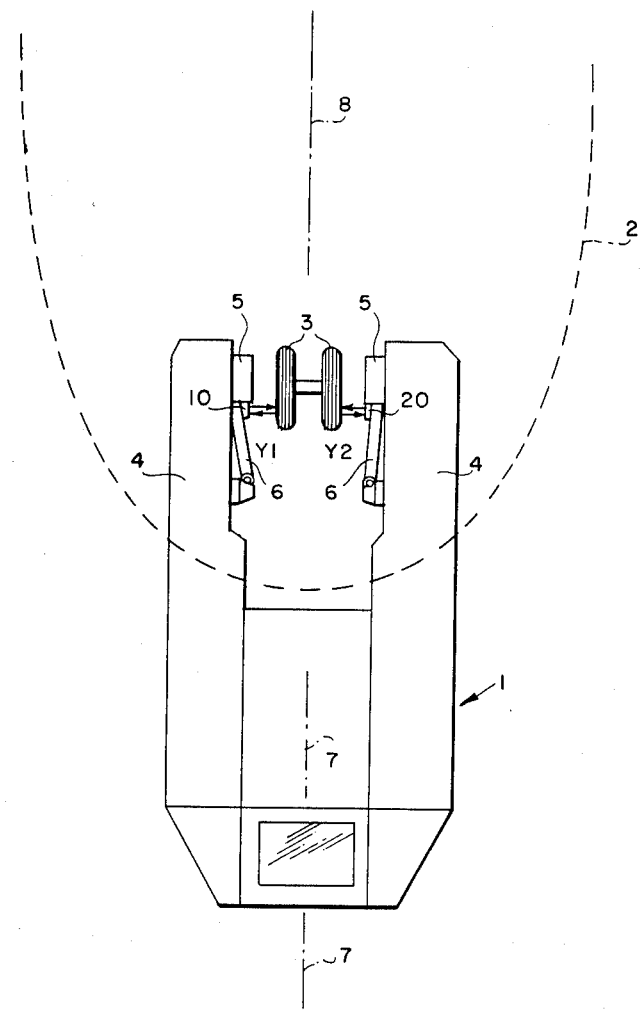
FIG. 1 shows a schematic top elevation of a tow vehicle in a position relative to the nose wheel assembly of an aircraft indicated only by its nose, wherein the type of the aircraft is determined by measuring the track width of the nose gear.

A top view of a tow vehicle is illustrated in FIG. 1 in a position relative to the fuselage 2 of a commercial aircraft, not shown in detail. The track width of the nose gear 3 (designated hereafter simply as the "nose wheel") is measured prior to a raising operation in order to determine the type of the aircraft.

The tow vehicle 1 has a fork-like frame part 4. Two lifting blades 5 are supported by hydraulically actuated guide bars 6 on the frame. The tow vehicle 1 is turned from its measuring position shown in FIG. 1 approximately 90°, so that the longitudinal axis of the vehicle is about perpendicular to the longitudinal axis of the aircraft for the raising operation. The nose wheel 3 is then in its straightforward position as shown in FIG. 1.

Figure 2:
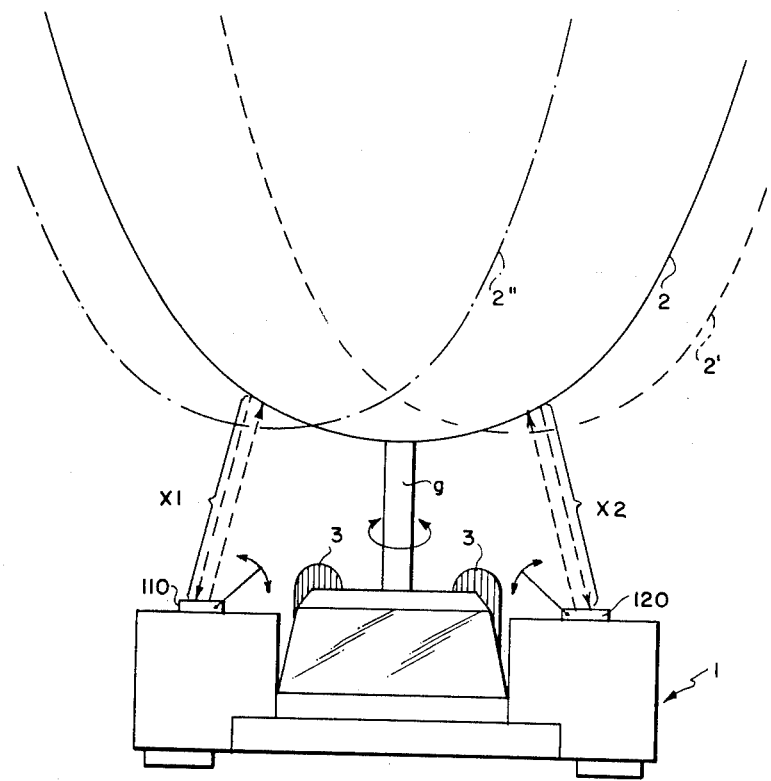
FIG. 2 shows a schematic view of a tow vehicle during the towing process, wherein the turn-out angle between the longitudinal axes of the tow vehicle and the aircraft is continuously determined and monitored.

As the result of the aforementioned turning of the tow vehicle 1, the lifting blades 5 may be applied in a scissor fashion to the running surface of the nose wheel to raise said wheel. The tow vehicle 1 is returned to the position shown in FIG. 1 after lifting of the nose wheel 3 so that the towing process may be carried out. The nose wheel 3, held by the lifting blades 5, is rotated with the vehicle, together with the nose wheel column g (FIG. 2).

Two transmitter/receivers 10, 20 are mounted in the area of the lifting blades on the tow vehicle 1 for measuring the track width of the nose wheel 3. Measuring beams, indicated in FIG. 1 by arrows, extend horizontally between the transmitter/receivers 10, 20 and the adjacent frontal surfaces of the nose wheel 3. The distances Y1, Y2 between the transmitters/receivers 10, 20 and the adjacent frontal surface of the nose wheel 3 are determined from the transit time of the measuring beams. The track width sought is determined from the difference between a predetermined distance of the transmitters/receivers 10, 20 and the sum of the measured distances Y1, Y2, as explained in connection with the block circuit diagram with reference to FIG. 3.

The transmitter/receivers 10, 20 utilize sound pulse or other electromagnetic pulse signals for measuring distances Y1 and Y2 without contacting the nose gear 3.

Figure 3:
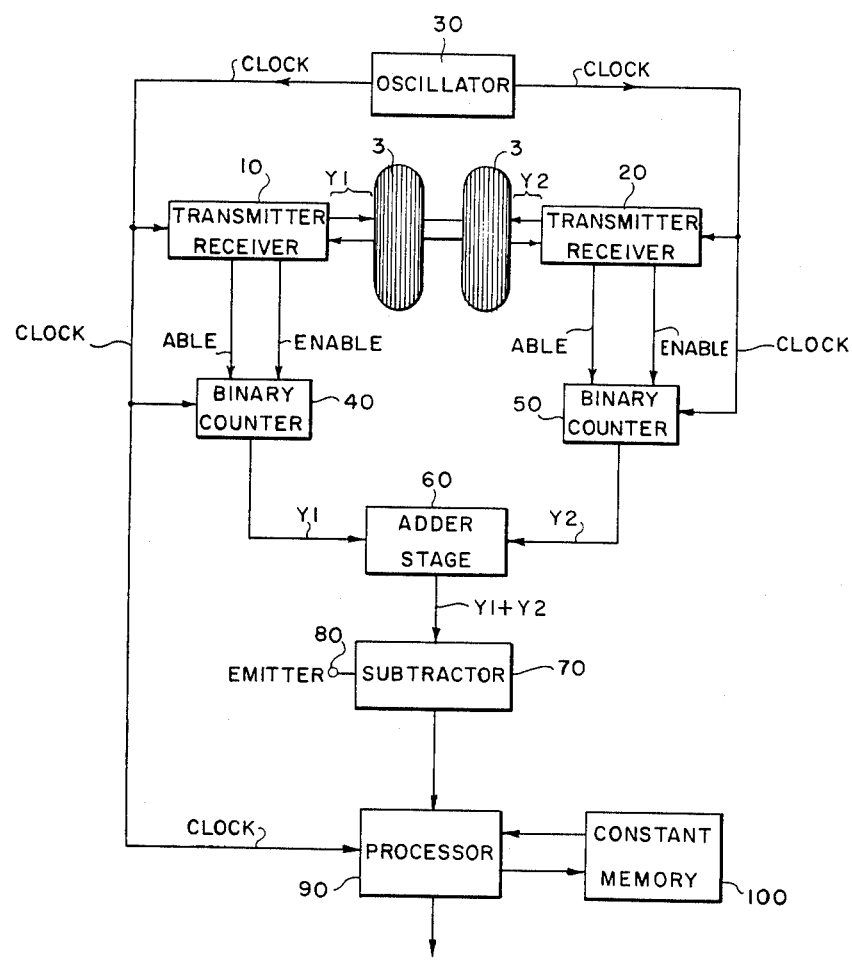
FIG. 3 shows a block circuit diagram of a device provided for the measurement of the track width of the nose gear.

A clock oscillator 30 synchronizes the transmitter/receivers 10, 20, the binary counters 40, 50 associated with the transmitters/receivers 10, 20, and a processor 90 as seen in FIG. 3. The processor 90 is provided for performing the evaluation itself. The timing lines from the oscillator 30 are designated the "clock". Upon emission of a measuring pulse signal by the associated transmitters each binary counter 40, 50, receives a start signal ("able" line) and upon the receipt of the corresponding reflected measuring pulse signal a stop signal ("enable" line). The count, of each counter 40, 50, between the emission and receipt of the measuring pulse signal, corresponds to a measure of the distance Y1 and Y2 involved and is transmitted to an adder stage 60. The binary counters 40, 50 are reset so as to be ready for operation when the next start signal is received.

The preascertained distance between the two transmitter/receivers 10, 20 is provided by an emitter 80 to the subtractor 70. The sum signal of the two measured distances Y1, Y2 (output of the adding stage 60) is subtracted from the preascertained distance in order to determine the track width of the nose wheel. The track width signal is compared in a processor with the track widths of different aircraft types in order to identify the type of the aircraft types in order to identify the type of the aircraft by means of the track width determined. For this purpose, the processor 90 communicates with a constant memory 100 wherein the type specific track widths are stored. The constant memory may be a ROM or any suitable memory for storing a table of data. As soon as the processor associates the track width determined with a certain aircraft type, it produces an aircraft type identification signal.

FIG. 2 shows two transmitter/receivers 110, 120 located on the left and right upper edge of the lateral contour of the tow vehicle 1 for measuring the turn-out signal. The transmitter/receivers 10, 20 may be utilized as transmitter/receivers 110, 120 if they are mounted pivotingly.

The transmitter/receivers 110, 120 are oriented at a constant angle of elevation with respect to the vehicle platform at the bottom side of the aircraft fuselage 2, as shown by the measuring beams indicated in FIG. 2 by the arrows. In this particular case, the distances X1, X2 between the fuselage 2 and the transmitters/receivers 110, 120 are measured.

Figure 4:
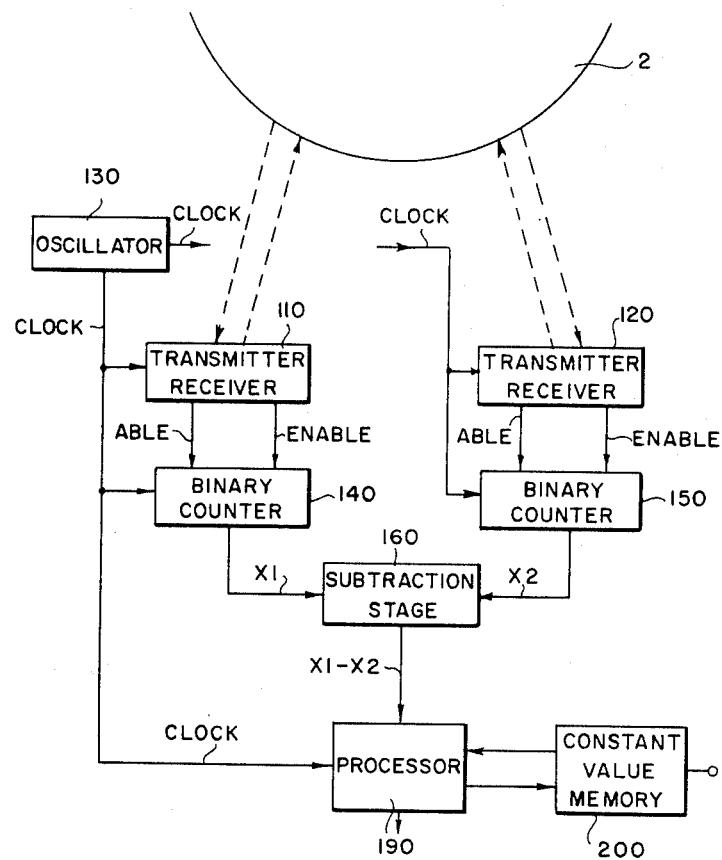
FIG. 4 shows a block circuit diagram of a device provided to measure the turn-out angle.

If the longitudinal axis 7 of the vehicle and the longitudinal axis 8 of the aircraft coincide (FIG. 1), the measured distances X1, X2 are identical. This case is indicated in FIG. 2 by an aircraft fuselage 2 drawn with a solid line. The positions 2' and 2" illustrated in FIG. 2 with a broken and a dash-and-dot line respectively represent a fuselage displaced to the left or right wherein the longitudinal axes 7 and 8 do not coincide. The extent of the turn-out from the position shown by the solid line and the sign of the turn-out may be determined from the difference between the two measured distances X1 and X2 and the known curvature of the specific aircraft type nose 2. FIG. 4 shows the functional blocks required for ascertaining the relative fuselage position. The system of FIG. 3 differs in that in FIG. 4 the adder is eliminated and the counter 140, 150 outputs are connected to the subtractor.

The transmitters/receivers 110, 120 are synchronized by a clock oscillator 130, which also synchronizes a processor 190 intended for the evaluation. The timing lines are designated as "clock". Each transmitter/receiver 110, 120 controls an associated binary counter 140, 150 in the manner set forth above for transmitter/receivers 10, 20 and the binary counters 40, 50 in connection with FIG. 3. The counter settings correspond to the distances X1, X2. The output of binary counters 140, 150 are subtracted from each other in a subtraction stage 160 and the difference is input to the processor 190. The processor 190 weights the result of the subtraction with an aircraft specific correction factor, whereby the type specific curvature of the nose 2 of the aircraft is taken into account. The type specific correction factor is read from a constant value memory 200 at the processor 190, preferably while addressing the aircraft type identification signal at the outlet of the processor 90 according to FIG. 2. Alternatively a user may enter an aircraft type identification signal manually.

What is claimed is:

1. An aircraft tow vehicle comprising:
   a fork shaped frame exhibiting a first support member and a second support member opposing said first support member;
   means for gripping and lifting a wheel assembly between said first and second support members disposed on said fork shaped frame
   first measuring means for contactless measurement of a width of said wheel assembly disposed on said fork shaped frame; and
   second measuring means for contactless measurement of distances between two points on said tow vehicle and an aircraft, disposed on said fork shaped frame;
   first processor means for generating an aircraft type identification signal responsive to said first measuring means;
   second processor means for generating an output indicative of an instantaneous turn-out angle between said vehicle and said aircraft responsive to said second measuring means; and
   means for generating an indication signal when said turn-out angle exceeds a predetermined value corresponding to said aircraft type identification signal, responsive to said second processor means output and said aircraft type identification signal.

2. An aircraft tow vehicle according to claim 1, wherein each of said first and second measuring means comprise a first and second spaced apart means for transmitting and receiving pulse signals.

3. An aircraft tow vehicle according to claim 2, wherein said first means for transmitting and receiving is arranged on said first support member and said second means for transmitting and receiving is arranged in opposing alignment on said second support member.

4. An aircraft tow vehicle according to claim 2, wherein said means for transmitting and receiving of said first measuring means are aligned for measuring distances to opposing surfaces of said wheel assembly.

5. An aircraft tow vehicle according to claim 2, wherein said first and second measuring means each further comprise a first and second counter means each responsive to respective means for transmitting and receiving, for ascertaining time between transmission of a pulse and receipt of said pulse wherein said ascertained time corresponds to a distance measured.

6. An aircraft tow vehicle according to claim 5, wherein said first processor means comprises:
   means for adding outputs of said first and second counter means, means for subtracting an output of said means for adding from a preascertained count corresponding to a respective distance between said means for transmitting and receiving of said first measuring means, and means for evaluating an output of said means of subtracting against stored values.

7. An aircraft tow vehicle according to claim 5, wherein said second processor means comprises:
   means for subtracting an output of said first counter means from an output of said second counter means of said second measuring means; and
   said means for generating is responsive to said means for subtracting and a stored correction factor corresponding to said aircraft type identification signal for evaluating an output of said means for subtracting.

8. An aircraft tow vehicle according to claim 5, wherein respective first means for transmitting and receiving of said first measuring means and said second measuring means are a first common pivot mounted means for transmitting and receiving, and
   respective second means for transmitting and receiving of said first measuring means and said second measuring means are a second common pivot mounted means for transmitting and receiving.

9. An aircraft tow vehicle according to claim 8, wherein said first processor means comprises:
   means for adding outputs of said first and second counter means, means for subtracting an output of said means for adding from a preascertained count corresponding to a respective distance between said means for transmitting and receiving, and means for evaluating an output of said means for subtracting against stored values.

10. An aircraft tow vehicle according to claim 9, wherein said second processor means comprises:
    means for subtracting an output of said first counter means from an output of said second counter means; and
    means for generating is responsive to said means for subtracting and a stored correcting factor corresponding to said aircraft identification signal for evaluating an output of said means for subtracting.

11. An aircraft tow vehicle according to claim 2, wherein said means for gripping and lifting exhibits;
    a first lifting blade articulated on said first support member,
    a second lifting blade articulated on said second support member, and
    means for displacing said first and second blades connected to said frame.

12. An aircraft tow vehicle according to claim 11, wherein said means for transmitting and receiving of said first measuring means are mounted in proximity to said first and second lifting blade respectively.

13. An aircraft tow vehicle according to claim 2, wherein said means for transmitting and receiving of said second measuring means are mounted at angles of elevation of 70-80 degrees relative to said frame.

14. An aircraft tow vehicle according to claim 2, wherein said means for transmitting and receiving of said second measuring means are oppositely aligned in a fashion suitable for measuring distances to respective points on an aircraft fuselage.

* * * * *